(12) United States Patent
Verrall et al.

(10) Patent No.: US 8,268,914 B2
(45) Date of Patent: Sep. 18, 2012

(54) WATER-SOLUBLE FILM

(75) Inventors: Andrew P. Verrall, Crown Point, IN (US); Solomon E. Brown, Naperville, IL (US); Dennis A. Beckholt, Cincinnati, OH (US)

(73) Assignee: Monosol, LLC, Merrillville, IN (US)

( * ) Notice: Subject to any disclaimer, the term of this patent is extended or adjusted under 35 U.S.C. 154(b) by 403 days.

(21) Appl. No.: 12/513,024

(22) PCT Filed: Nov. 13, 2007

(86) PCT No.: PCT/US2007/084566
§ 371 (c)(1),
(2), (4) Date: Aug. 11, 2009

(87) PCT Pub. No.: WO2008/064014
PCT Pub. Date: May 29, 2008

(65) Prior Publication Data
US 2010/0105821 A1    Apr. 29, 2010

Related U.S. Application Data

(63) Continuation-in-part of application No. 11/733,595, filed on Apr. 10, 2007, now abandoned, which is a continuation-in-part of application No. 11/559,262, filed on Nov. 13, 2006, now abandoned.

(60) Provisional application No. 60/885,838, filed on Jan. 19, 2007.

(51) Int. Cl.
*C08L 89/00* (2006.01)

(52) U.S. Cl. .......................................... 524/10; 524/421

(58) Field of Classification Search .................... 524/10, 524/421
See application file for complete search history.

(56) References Cited

U.S. PATENT DOCUMENTS

| | | | |
|---|---|---|---|
| 3,692,725 A * | 9/1972 | Duchane | 524/377 |
| 4,801,636 A | 1/1989 | Smith et al. | |
| 6,310,027 B1 | 10/2001 | Dale | |
| 6,608,128 B1 | 8/2003 | Jakob et al. | |
| 6,660,704 B1 | 12/2003 | Waschenbach et al. | |
| 6,800,598 B1 | 10/2004 | Waeschenbach et al. | |
| 7,083,047 B2 | 8/2006 | Bone et al. | |
| 2002/0187910 A1 | 12/2002 | Speed et al. | |
| 2002/0198125 A1 | 12/2002 | Jones | |
| 2004/0030034 A1 | 2/2004 | Chang et al. | |
| 2004/0065578 A1 | 4/2004 | Bone et al. | |
| 2004/0259749 A1 | 12/2004 | Braeckman et al. | |
| 2006/0165625 A1 | 7/2006 | Verrall et al. | |
| 2006/0257596 A1 | 11/2006 | Catalfamo et al. | |
| 2008/0146481 A1 | 6/2008 | Brown et al. | |

FOREIGN PATENT DOCUMENTS

| | | |
|---|---|---|
| EP | 1418196 | 5/2004 |
| JP | 4222280 | 8/1992 |
| JP | 6-157860 | 6/1994 |
| KR | 159976 | 8/1994 |
| WO | WO-02/08380 | 1/2002 |
| WO | WO-02/102955 | 12/2002 |
| WO | WO-02/102956 | 12/2002 |
| WO | WO-2004/031271 | 4/2004 |
| WO | WO-2006/124484 | 11/2006 |

OTHER PUBLICATIONS

Office Action for U.S. Appl. No. 11/733,595, dated Dec. 23, 2009.
Final Office Action for U.S. Appl. No. 11/983,999, dated Jan. 26, 2009.
Nonfinal Office Action for U.S. Appl. No. 11/983,999, dated May 13, 2008.
International Search Report and Written Opinion from counterpart International Application No. PCT/US07/84566 (dated May 5, 2008).
Office Action dated May 22, 2007 from U.S. Appl. No. 10/851,713, filed May 21, 2004 (20 pp.).
Park et al., "Physical Properties of PVOH/Chitosan-Blended Films Cast From Different Solvents", *Food Hydrocolloids* 15: 499-502 (2001).

* cited by examiner

*Primary Examiner* — Peter D Mulcahy
(74) *Attorney, Agent, or Firm* — Marshall, Gerstein & Borun LLP

(57) ABSTRACT

A film-forming composition made from a mixture of PVOH, chitosan, an alkali metal or ammonium bisulfite or metabisulfite, and optional ingredients such as plasticizers, antioxidants, UV stabilizers, surfactants, crosslinking agents, lubricants, and extenders, is disclosed. Also disclosed are a method of making a film from the composition, a resulting film, and a packet made from the film and containing a cleaning composition such as a rinse additive. The composition can be formulated to yield an article such as a film which is soluble only below a predetermined pH threshold.

26 Claims, 1 Drawing Sheet

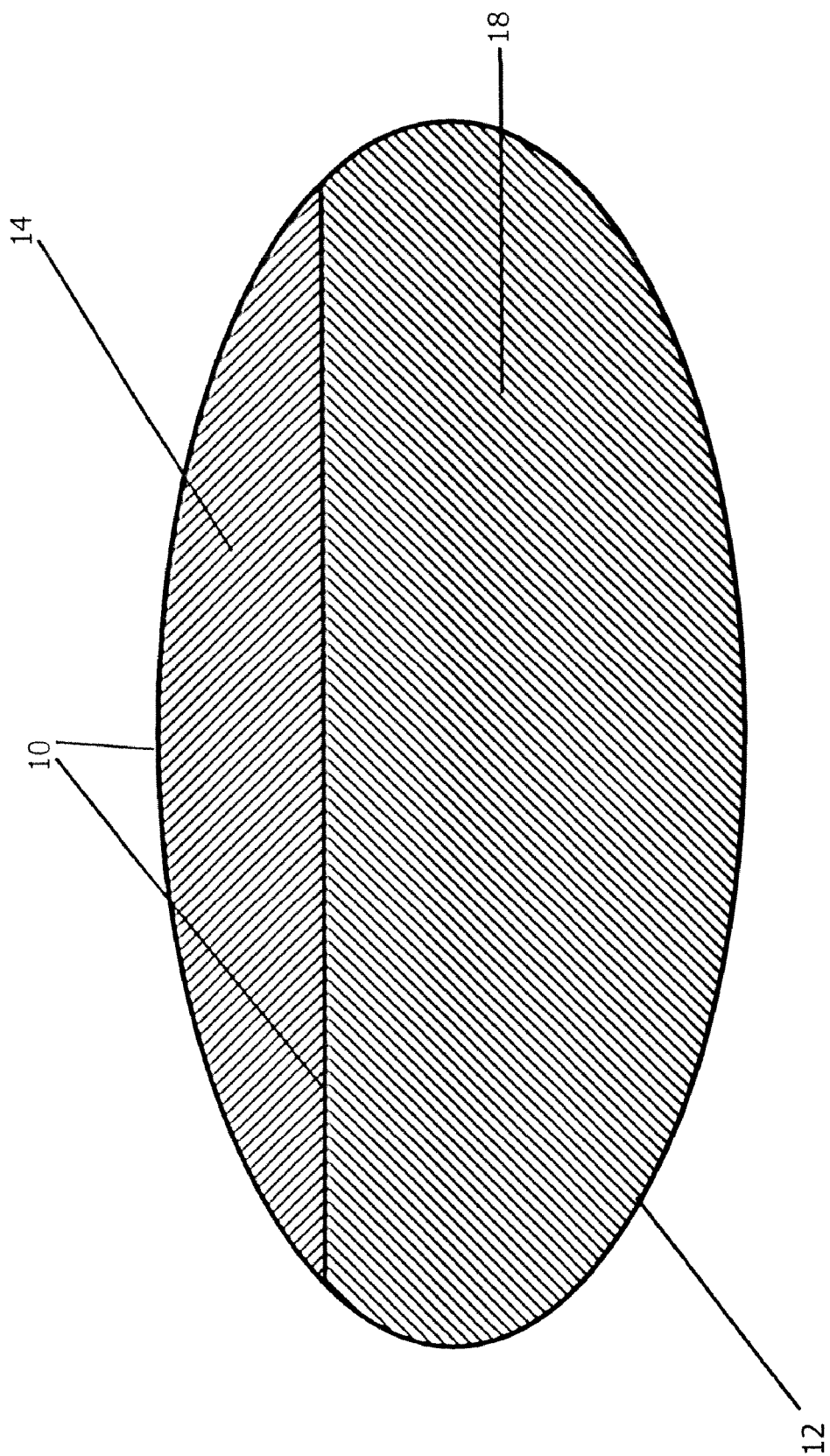

WATER-SOLUBLE FILM

CROSS-REFERENCE TO RELATED APPLICATIONS

This is a continuation-in-part of U.S. patent application Ser. No. 11/733,595, filed Apr. 10, 2007, which is a continuation-in-part of U.S. patent application Ser. No. 11/559,262, filed Nov. 13, 2006, and the benefit under 35 U.S.C. §119(e) of U.S. Provisional Patent Application Ser. No. 60/885,838 filed Jan. 19, 2007, is hereby claimed. The entire disclosures of the foregoing applications are hereby incorporated herein by reference.

BACKGROUND

1. Field of the Disclosure

The disclosure relates generally to water-soluble structures such as films. More particularly, the disclosure relates to water soluble-films which are soluble only in particular pH ranges, which find utility in the packaging of cleaning actives, such as rinse additives.

2. Brief Description of Related Technology

Water-soluble polymeric films are known in the art and are described in several references. Such polymeric films are commonly used in packaging materials to simplify dispersing, pouring, dissolving, and dosing a material to be delivered. Water-soluble film packages of such polymeric materials can be directly added to a mixing vessel, advantageously avoiding contact with toxic or messy materials, and allowing accurate formulation in the mixing vessel. Soluble pre-measured polymeric film pouches aid convenience of consumer use in a variety of applications, particularly those involving wash additives. As used hereinafter, rinse additive refers to those materials which are intended for use, or are most efficacious in a rinse portion of a wash cycle and are intended to improve a property, such as the aesthetics, feel, appearance, sanitation or cleanliness of fabrics or wares which can be washed in machine washing apparatus. Such wash additives are preferably rinse-added after an alkaline detergent wash has occurred, and include but are not limited to fabric softeners, brighteners, anti-redeposition agents, bleaches, and surfactant rinse aids for dishwashing. It is desirable to effectuate the release of the additives during the rinse portion, rather than during the wash portion, of the wash cycle. It is further desirable to add these products to a washing machine initially, at the start of the wash cycle, thereby avoiding the need to monitor the cleaning process and introduce the additives at the beginning of the rinse portion of the wash cycle. Polymeric films used to contain such additives would have to be insoluble during the wash phase and become soluble during the rinse phase, and solubility preferably is triggered by a difference in pH of the wash solution.

SUMMARY

One aspect of the disclosure provides a method of making a water-soluble film, including the steps of slurrying a PVOH polymer in a dilute aqueous solution of chitosan; adding any optional ingredients to the slurry, including plasticizers, antioxidants, UV stabilizers, surfactants, crosslinking agents, lubricants, and extenders; heating the slurry with agitation to thereby solubilize the PVOH; adding an alkali metal or ammonium bisulfite or metabisulfite to the solution and optionally agitating the solution to thereby solubilize the alkali metal or ammonium bisulfite or metabisulfite, cooling the solution; and casting the solution and drying off solvent to thereby obtain a water-soluble polymer film.

Another aspect of the disclosure provides a water-soluble film including a mixture of PVOH, chitosan in an amount up to 20 wt %, and an alkali metal or ammonium bisulfite or metabisulfite.

Still another aspect of the disclosure provides a water-soluble film including a mixture of PVOH, chitosan, and an alkali metal or ammonium bisulfite or metabisulfite wherein the weight ratio of PVOH to chitosan in a range of about 12:1 to about 3:1.

Yet another aspect of the disclosure provides a sealed packet including a film according to the disclosure herein.

Further aspects and advantages will be apparent to those of ordinary skill in the art from a review of the following detailed description, taken in conjunction with the drawing. While the compositions, films, and packets described herein are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWING

For further facilitating the understanding of the present invention, one drawing FIGURE is appended hereto.

FIG. 1 shows a two-compartment pouch made from a film according to the disclosure herein and a conventional PVOH film and containing an ADW detergent in one compartment and a rinse additive in the other compartment.

DETAILED DESCRIPTION

The film-forming composition described herein includes a combination of polyvinyl alcohol (PVOH), chitosan, and an alkali metal or ammonium bisulfite or metabisulfite. The components can be formulated by the teachings herein to create an article, such as film, which is soluble in aqueous solutions having a predetermined pH threshold. Such films find utility in, for example, creation of sealed packets for delayed release of cleaning actives or rinse additives such as those found in automatic dishwashing detergent compositions or laundry detergent compositions. The sealed packets can be made from any suitable method, including such processes and features such as heat sealing and adhesive sealing (e.g., with use of a water-soluble adhesive).

The major components of the composition are PVOH, chitosan, and an alkali metal or ammonium bisulfite or metabisulfite. In one type of embodiment, the PVOH has a degree of hydrolysis of greater than 88%, more preferably at least 92% and more preferably 98% or less, for example in a range of about 92% to about 98%. In another type of embodiment, the PVOH is fully hydrolyzed (e.g., 99% to 100%). The molecular weight of the PVOH is not particularly limited, but a medium molecular weight PVOH having a 4% aqueous solution viscosity of about 20 cps to about 30 cps (e.g., 28 cps) at 20° C. is preferred for processability and strength of the resulting film. The PVOH is preferably present in a range of about 50% by weight, based on the total weight of the film (wt %) to about 90 wt %, on a dry basis, for example about 60 wt % to about 80 wt %, or about 70 wt %.

Chitosan (poly[-(1,4)-2-amino-2-deoxy-D-glucopiranose]) is a partially or fully deacetylated form of chitin, a naturally occurring polysaccharide present in shellfish, for example. Structurally, chitin is a polysaccharide consisting of beta-(1,4) 2-acetamido-2-deoxy-D-glucose units, some of which are deacetylated:

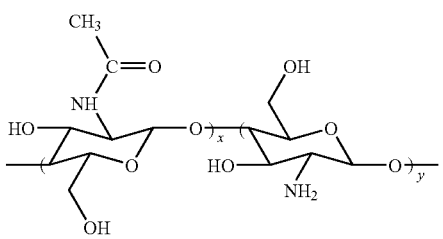

wherein x=0.85-0.95 and y=0.15-0.05, for example. The degree of deacetylation usually varies between 8 and 15 percent, but depends on the species from which the chitin is obtained, and the method used for isolation and purification.

Chitin is not one polymer with a fixed stoichiometry, but a class of polymers of N-acetylglucosamine with different crystal structures and degrees of deacetylation, and with fairly large variability from species to species. The polysaccharide obtained by more extensive deacetylation of chitin is chitosan:

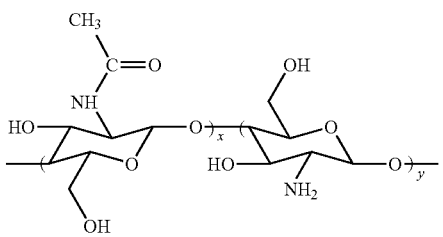

wherein x=0.50-0.10, and y=0.50-0.90, for example.

Like chitin, chitosan is a generic term for a group of polymers of acetylglucosamine, but with a degree of deacetylation of generally between 50 and 95 percent. Chitosan is the beta-(1,4)-polysaccharide of D-glucosamine, and is structurally similar to cellulose, except that the C-2 hydroxyl group in cellulose is substituted with a primary amine group in chitosan. The large number of free amine groups (pKa=6.3) makes chitosan a polymeric weak base. Both chitin and chitosan are insoluble in water, dilute aqueous bases, and most organic solvents. However, unlike chitin, chitosan is soluble in dilute aqueous acids, usually carboxylic acids, as the chitosonium salt. Solubility in dilute aqueous acid is therefore a simple way to distinguish chitin from chitosan.

Chitosan is available in different molecular weights (polymers e.g., 50,000 Daltons (Da); oligomers e.g., 2,000 Da), viscosity grades, and degrees of deacetylation (e.g., 40% to 98%). Chitosan is generally regarded as non-toxic and biodegradable. The degree of acetylation has a significant effect on the amine group pKa, and hence solubility behavior, and the rheological properties of the polymer. The amine group on the mostly deacetylated polymer has a pKa in the range of 5.5 to 6.5, depending on the source of the polymer. At low pH, the polymer is soluble, with the sol-gel transition occurring at approximate pH 7. Both natural chitosan and synthetic poly-D-glucosamines are contemplated for use.

The degree of acetylation of the chitosan will influence the pH value at which the film begins to dissolve. As the degree of acetylation increases, the pH above which the film dissolves increases. The degree of acetylation of the chitosan is preferably about 65% or less, or 70% or less, for example in ranges such as about 50% to about 65%, about 55% to about 65%, or about 60% to about 65% (e.g., 52%, 62.5%, or 64%) to provide a film with a pH solubility trigger of about 9.2 or 9.3. This material can be obtained by a reacetylation reaction, using acetic anhydride, of commercially available 85% to 95% deacetylated chitosan in aqueous acetic acid, by methods known in the art. The molecular weight of the chitosan is not particularly limited but a weight average molecular weight of about 150,000 Da to about 190,000 Da is preferred. Chitosan is preferably present in a range of about 1 wt % to about 20 wt %, and the following specific contents are contemplated: up to 15 wt %, up to 12 wt %, up to 1.0 wt %, up to 8 wt %, 4 wt % to 12 wt %, and 6 wt % to 10 wt %. The weight ratio of PVOH to chitosan is contemplated to be in a range of about 12:1 to about 3:1, or about 8:1 to about 10:1, for example about 9:1. It is surprising that use of such low levels of chitosan can provide the desired pH-triggering ability for dissolving the film.

To determine of the acetylation degree, prepare three solutions of acetic acid of about 0.01, 0.02 and 0.003 M and a deionized water sample, and measure and record the first derivative spectra from 240 nm to 190 nm. The superposition of the three spectra shows the zero crossing point for the acid. Prepare four or five reference solutions of N-acetylglucosamine in the range 0.5 mg to 3.5 mg in 100 ml of 0.01 M acetic acid and record the spectra as before. Superpose all spectra recorded and the measure the height H (mm) for each reference concentration above the zero crossing point. Draw a calibration curve of H versus concentration of N-acetylglucosamine. Determine the curve equation H=f(C). Dissolve 500 mg of dry chitosan (i.e. previously freeze dried) in 50 ml of 0.1 M acetic acid and then dilute to 500 ml with water. In case the degree of acetylation is high, a further 10-fold dilution is necessary. Transfer the solution to a Far-UV cuvette with 10 mm path length. Different spectrophotometers may be used: for instance the BECKMAN DU 640, the KONTRON UVIKOV 810 and the PERKIN ELMER 550 SE. Obtain the derived spectra at a light with of 1 nm, a scanning speed of 30 nm/min and a time constant of 4 sec, chart speed 10 cm/min. For degree of acetylation lower than 0.11, correct the final result with a coefficient deduced from the correction curve.

Without intending to be bound by any particular theory, it is believed that the changes in amine group pKa with degree of acetylation of chitosan are related to charge repulsion. Thus in polymers with low acetylation, protonation of an amine group reduces the basicity of neighboring amine groups (lower pKa) because the resultant positive charges will tend to repel one another. On the other hand, in more highly acetylated polymers, free amine groups are more isolated from one another so that charge repulsion cannot occur. This would give rise to greater basicity (higher pKa) and these groups would be expected to behave more like those of a typical primary amine.

Further, and without intending to be bound by any particular theory, it is believed that the alkali metal or ammonium bisulfite or metabisulfite in the example described below functions by reacting with terminal aldehyde groups on the PVOH to form hydroxysulfonic acid salt adducts, and so prevents Schiff base reactions between PVOH aldehyde groups and chitosan amine groups. It is posited that such Schiff base formation, which occurs over time in the finished film, represents a type of crosslink and it has been observed that, in the absence of an alkali metal or ammonium bisulfite or metabisulfite, the film gradually loses its water solubility until it is completely insoluble at all pHs in approximately two weeks.

Accordingly, contemplated as an aspect of the invention is a film or other solid water-soluble article made by mixing an aqueous solution of PVOH, chitosan, and an alkali metal or ammonium bisulfite or metabisulfite, and subsequently drying off the water, for example by the specific process described below. The alkali metal or ammonium bisulfite or metabisulfite preferably is present in the film in an amount up to about 1 wt %, for example about 0.01 wt % to about 1 wt %, or more preferably about 0.02 wt % to about 0.25 wt %. For example, sodium bisulfite preferably is used in an amount in a range of about 0.02 wt % to about 0.2 wt %, e.g., 0.1 wt %. Put another way, the alkali metal or ammonium bisulfite or metabisulfite can be present in an amount up to about 0.9% based on the weight of the PVOH used in the film, for example about 0.005% to about 0.9%, or 0.006% to about 0.8% depending on the type of alkali metal or ammonium bisulfite or metabisulfite. For example, sodium bisulfite is preferably is used in an amount in a range of about 0.01% to about 0.22%, e.g., 0.1%, based on the weight of PVOH. Inclusion of an alkali metal or ammonium bisulfite or metabisulfite in a preferred amount of up to 1 wt % in the film, for example, can provide both prolonged stability and bleaching/decolorization. As a practical matter, the alkali metal or ammonium bisulfite or metabisulfite can be added in excess of 1% in any amount which does not negatively affect the performance of the composition (e.g., film-forming ability, tensile strength, dissolution ability) for a desired application. Accordingly, the amount of alkali metal or ammonium bisulfite or metabisulfite is preferably about 20 wt % or less, for example 15 wt % or less, 10 wt % or less, 5 wt % or less, or 2 wt % or less.

The film composition and film can contain other auxiliary film agents and processing agents, such as, but not limited to, plasticizers, lubricants, release agents, fillers, extenders, crosslinking agents, antiblocking agents, antioxidants, detackifying agents, antifoams, nanoparticles such as layered silicate-type nanoclays (e.g., sodium montmorillonite), bleaching agents (e.g., sodium bisulfite or others), and other functional ingredients, in amounts suitable for their intended purpose. The amount of such secondary agents is preferably up to about 10 wt %, more preferably up to about 5 wt %, e.g., up to 4 wt %.

Examples of crosslinking agents include, but are not limited to, borax, borates, boric acid, citric acid, maleic acid, oxalic acid, malonic acid, succinic acid, cupric salts, water-soluble polyamide-epichlorohydrin, and combinations thereof. Preferred crosslinking agents include boric acid and water-soluble polyamide-epichlorohydrin, particularly boric acid. A water-soluble polyamide-epichlorohydrin is available under the trade name POLYCUP 172 by Hercules, Inc. of Wilmington, Del. The crosslinking agent preferably is present in an amount up to about 10 wt %, for example about 0.1 wt % to about 10 wt %, or 0.1 wt % to about 5 wt %, depending on the type of crosslinking agent. For example, boric acid preferably is used in an amount in a range of about 0.3 wt % to about 0.7 wt %, e.g., 0.5 wt %. Put another way, the crosslinking agent can be present in an amount up to about 10% based on the weight of the PVOH used in the film, for example about 0.1% to about 10%, or 0.1% to about 5%, depending on the type of crosslinking agent. For example, boric acid preferably is used in an amount in a range of about 0.5% to about 0.9%, e.g., 0.7%, based on the weight of PVOH.

By incorporating a sodium montmorillonite nanoclay, for example in an amount up to about 10 wt %, together with a crosslinking agent as described herein in the film-forming composition, a completely water-impermeable PVOH film can be formed that is soluble in hot water at a predetermined pH.

Embodiments including plasticizers are preferred. Preferred plasticizers include, but are not limited to, glycerin, sorbitol, and 2-methyl-1,3-propanediol. Combinations of glycerin and sorbitol are preferred. In preferred embodiments glycerin is used in an amount from about 10 wt % to about 20 wt % or 12 wt % to about 18 wt %, e.g., about 15 wt %. In preferred embodiments sorbitol is used in an amount from about 1 wt % to about 10 wt % or 2 wt % to about 8 wt %, e.g., about 3 wt %.

A film can be made by the composition described herein according to any suitable method. The following method is preferred: disperse all ingredients except PVOH and the alkali metal or ammonium bisulfite or metabisulfite in a cold solution of chitosan (e.g., 2 wt %), slurry the PVOH in the resulting solution, heat (e.g., to 95° C.) with agitation to solubilize the PVOH, then cool to 85° C.; add the alkali metal or ammonium bisulfite or metabisulfite after a period of time delay, mix, cast the solution, and dry to yield a film. In the alternative, the PVOH can be slurried first in a cold solution of chitosan, and then the additional ingredients can be added. It will be understood by a person of ordinary skill in the art that other useful structures can be made by different operations, such as molding.

It has been found that it is preferable to delay the addition of the alkali metal or ammonium bisulfite or metabisulfite to the solution for a period of between about 2 to about 24 hours, preferably about 4 hours to about 20 hours, and more preferably about 7 hours to about 20 hours in order to optimize the wet strength of the film during the wash cycle. It is believed that during this period, some degree of Schiff base formation takes place in solution which enhances the strength of the film via mild crosslinking, but does not unduly compromise its water solubility.

The resulting film preferably is formulated to be insoluble in highly alkaline solutions (e.g., pH greater than 9.3, preferably greater than 10) and preferably also stable when in contact with detergent compositions. The resulting film also preferably has sufficient wet strength to withstand agitation in an automatic washing apparatus for the intended use during pre-rinse phases of washing.

Use of a film embodiment according to the description can provide a pH-dependent water-soluble film. Use of a film embodiment according to the description can also provide a pH-dependent, water-soluble release means.

The film is useful for containing a detergent composition comprising cleaning actives. In one embodiment, the film according to the description can be utilized to make a packet. This packet may contain a detergent composition including one or more cleaning actives. The cleaning actives may take any form such as powders, gels, pastes, liquids, tablets or any combination thereof.

As used hereinafter, rinse additive refers to those materials which are intended for use, or are most efficacious in a rinse portion of a wash cycle and are intended to provide or improve a property, such as the aesthetics, feel, appearance, sanitation or cleanliness of fabrics or wares which can be washed in machine washing apparatus. Such wash additives are preferably rinse-added after an alkaline detergent wash has occurred, and include but are not limited to fabric softeners, brighteners, anti-redeposition agents, bleaches, and surfactant rinse aids for dishwashing. It is desirable to effectuate the release of the additives during the rinse portion, rather than during the wash portion, of the wash cycle. It is further desirable to add these products initially, at the start of the wash cycle, thereby avoiding the need to monitor the cleaning process and add the additives at the beginning of the rinse portion of the wash cycle.

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated.

Alkali metal percarbonates, particularly sodium percarbonate are preferred perhydrates for use herein. The percarbonate is most preferably incorporated into the products in a coated form which provides in-product stability. A suitable coating material providing in product stability comprises mixed salt of a water-soluble alkali metal sulphate and carbonate. Such coatings together with coating processes have previously been described in GB-1,466,799. The weight ratio of the mixed salt coating material to percarbonate lies in the range from 1:99 to 1:9, and preferably from 1:49 to 1:19. Preferably, the mixed salt is of sodium sulphate and sodium carbonate which has the general formula $Na_2SO_4.nNa_2CO_3$ wherein n is from 0.1 to 3, preferably n is from 0.3 to 1.0 and most preferably n is from 0.2 to 0.5. Another suitable coating material providing in product stability, comprises sodium silicate of $SiO_2:Na_2O$ ratio from 1.8:1 to 3.0:1, preferably 1.8:1 to 2.4:1, and/or sodium metasilicate, preferably applied at a level of from 2% to 10%, (normally from 3% to 5%) of $SiO_2$ by weight of the inorganic perhydrate salt, such as potassium peroxymonopersulfate. Other coatings which contain magnesium silicate, silicate and borate salts, silicate and boric acids, waxes, oils, and fatty soaps can also be used advantageously within the invention.

Typical organic bleaches are organic peroxyacids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. The diacyl peroxide, especially dibenzoyl peroxide, should preferably be present in the form of particles having a weight average diameter of from about 0.1 to about 100 microns, preferably from about 0.5 to about 30 microns, more preferably from about 1 to about 10 microns. Preferably, at least about 25% to 100%, more preferably at least about 50%, even more preferably at least about 75%, most preferably at least about 90%, of the particles are smaller than 10 microns, preferably smaller than 6 microns.

Further typical organic bleaches include the peroxy acids, particular examples being the alkylperoxy acids and the arylperoxy acids. Preferred representatives are: (a) peroxybenzoic acid and its ring-substituted derivatives, such as alkylperoxybenzoic acids, but also peroxy-α-naphthoic acid and magnesium monoperphthalate; (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates; and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi(6-aminopercaproic acid).

Bleach activators are typically organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

Bleach catalysts preferred for use herein include the manganese triazacyclononane and related complexes (U.S. Pat. No. 4,246,612, U.S. Pat. No. 5,227,084); Co, Cu, Mn and Fe bispyridylamine and related complexes (U.S. Pat. No. 5,114,611); and pentamine acetate cobalt(III) and related complexes (U.S. Pat. No. 4,810,410). A complete description of bleach catalysts suitable for use herein can be found in WO 99/06521, pages 34, line 26 to page 40, line 16.

A preferred surfactant for use in automatic dishwashing is low foaming by itself or in combination with other components disclosed herein (e.g., suds suppressors). Preferred for use herein are low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., Olin Corporation's Poly-Tergent® SLF18), epoxy-capped poly(oxyalkylated) alcohols (e.g., Olin Corporation's Poly-Tergent® SLF18B—see WO-A-94/22800), ether-capped poly(oxyalkylated) alcohol surfactants, and block polyoxyethylene-polyoxypropylene polymeric compounds such as PLURONIC®, REVERSED PLURONIC®, and TETRONIC® by the BASE-Wyandotte Corp., Wyandotte, Mich.; amphoteric surfactants such as the $C_{12}$-$C_{20}$ alkyl amine oxides (preferred amine oxides for use herein include lauryldimethyl amine oxide and hexadecyl dimethyl amine oxide), and alkyl amphocarboxylic surfactants such as Miranol™ C2M; and zwitterionic surfactants such as the betaines and sultaines; and mixtures thereof. Surfactants suitable for use herein are disclosed, for example, in U.S. Pat. No. 3,929,678, U.S. Pat. No. 4,259,217, EP-A-0414 549, WO-A-93/08876 and WO-A-93/08874. Surfactants are typically present at a level of from about 0.2% to about 30% by weight, more preferably from about 0.5% to about 10% by weight, most preferably from about 1% to about 5% by weight of a detergent composition.

Builders suitable for use herein include water-soluble builders such as citrates, carbonates, silicate and polyphosphates, e.g. sodium tripolyphosphate and sodium tripolyphosphate hexahydrate, potassium tripolyphosphate and mixed sodium and potassium tripolyphosphate salts.

Enzymes suitable herein include bacterial and fungal cellulases such as CAREZYME and CELLUZYME (Novo Nordisk AIS); peroxidases; lipases such as AMANO-P (Amano Pharmaceutical Co.), M1 LIPASE and LIPOMAX (Gist-Brocades) and LIPOLASE and LIPOLASE ULTRA (Novo); cutinases; proteases such as ESPERASE, ALCALASE, DURAZYM and SAVINASE (Novo) and MAXATASE, MAXACAL, PROPERASE and MAXAPEM (Gist-Brocades); α and β amylases such as PURAFECT OX AM (Genencor) and TERMAMYL, BAN, FUNGAMYL, DURAMYL, and NATALASE (Novo); pectinases; and mixtures thereof. Enzymes are preferably added herein as prills, granulates, or cogranulates at levels typically in the range from about 0.0001% to about 2% pure enzyme by weight of the cleaning composition.

Suds suppressers suitable for use herein include nonionic surfactants having a low cloud point. "Cloud point" as used herein, is a well known property of nonionic surfactants which is the result of the surfactant becoming less soluble with increasing temperature, the temperature at which the appearance of a second phase is observable is referred to as the "cloud point" (See Kirk Othmer, pp. 360-362). As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Typical low cloud point nonionic surfactants include nonionic alkoxylated surfactants, especially ethoxylates derived from primary alcohol, and polyoxypropylene/polyoxyethylene/polyoxypropylene (PO/FO/PO) reverse block polymers. Also, such low cloud point nonionic surfactants include, for example, ethoxylated-propoxylated alcohol (e.g., BASF Poly-Tergent® SLF18) and epoxy-capped poly(oxyalkylated) alcohols (e.g., BASF Poly-Tergent® SLF18B series of nonionics, as described, for example, in U.S. Pat. No. 5,576,281).

Other suitable components herein include cleaning polymers having anti-redeposition, soil release or other detergency properties. While the weight average molecular weight of such dispersants can vary over a wide range, it preferably is from about 1,000 to about 500,000, more preferably is from about 2,000 to about 250,000, and most preferably is from about 3,000 to about 100,000. Sodium polyacrylate having a nominal molecular weight of about 4500, obtainable from Rohm & Haas under the trade name as ACUSOL® (e.g., ACUSOL 45N, 445N, 480N, and 460N), or acrylate/maleate copolymers such as are available under the tradename SOKALAN®, from BASF Corp. (e.g., SOKALAN PA30, PA20, PA15, PA10 and SOKALAN CP10), are preferred dispersants herein. The polymer dispersant commercially available under the trade name of SOKALAN® CP45 is a partially neutralized copolymer of methacrylic acid and maleic anhydride sodium salt is also suitable for use herein. Acrylic/methacrylic copolymers are also contemplated for use as dispersants.

Other suitable polymer dispersants for use herein are copolymers containing both acrylic acid and maleic acid comonomers, such as AQUALIC® ML9 polymers (supplied by Nippon Shokubai Co. LTD)

Other suitable polymer dispersants for use herein are polymers containing both carboxylase and sulphonate monomers, such as ALCOSPERSE® polymers (supplied by Alco).

Preferred soil release polymers herein include alkyl and hydroxyalkyl celluloses (U.S. Pat. No. 4,000,093), polyoxyethylenes, polyoxypropylenes and copolymers thereof, and nonionic and anionic polymers based on terephthalate esters of ethylene glycol, propylene glycol and mixtures thereof.

The present composition preferably comprises from about 0.1 wt % to about 20 wt %, from about 1 wt % to about 15 wt %, from about 1 wt % to about 10 wt %, by weight of the automatic dishwashing detergent of a polymer dispersant.

Heavy metal sequestrants and crystal growth inhibitors are also suitable for use herein, for example diethylenetriamine penta (methylene phosphonate), ethylenediamine tetra(methylene phosphonate) hexamethylenediamine tetra(methylene phosphonate), ethylene diphosphonate, hydroxy-ethylene-1, 1-diphosphonate, nitrilotriacetate, ethylenediaminotetracetate, ethylenediamine-N,N'-disuccinate in their salt and free acid forms.

Suitable for use herein is also a corrosion inhibitor such as organic silver coating agents (especially paraffins such as WINOG 70 sold by Wintershall, Salzbergen, Germany), nitrogen-containing corrosion inhibitor compounds (for example benzotriazole and benzimadazole—see GB-A-1137741) and Mn(II) compounds, particularly Mn(II) salts of organic ligands.

Glass care particulate zinc-containing materials useful in certain non-limiting embodiments may include the following: inorganic material such as zinc aluminate, zinc carbonate, zinc oxide and materials containing zinc oxide (i.e., calamine), zinc phosphates (i.e., orthophosphate and pyrophosphate), zinc selenide, zinc sulfide, zinc silicates (i.e., ortho- and meta-zinc silicates), zinc silicofluoride, zinc borate, zinc hydroxide and hydroxy sulfate.

Other suitable components herein include enzyme stabilizers such as calcium ion, boric acid and propylene glycol.

In one embodiment, use of a film embodiment according to the description can provide a water-soluble delivery system for a wash additive, which will remain insoluble during wash conditions and will rapidly and fully solubilize during rinse conditions to release a rinse additive.

Use of a film embodiment according to the description can also provide a means for delivery of a rinse additive, which means may be added during a wash portion of a wash cycle and which will deliver the rinse additive during a rinse portion of a wash cycle.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process. A review of the composition of rinse aids and methods for testing their performance is presented by W. Schirmer et al. in Tens. Surf. Det. 28, 313 (1991). European Patent 0 197 434 to Henkel describes rinse aids which contain mixed ethers as surfactants. Rinse additives such as fabric softeners and the like are also contemplated and suitable for encapsulation in a film according to the disclosure herein.

The film described herein can also be used to make a packet which contains two or more compartments made of the same film or containing a combination with of films of other polymeric materials. In another embodiment, the packet may contain two or more compartments, with one compartment partially made of the film of the present invention, preferably the film comprising an external wall of the packet.

Additional films can, for example, be obtained by casting, blow-molding, extrusion or blown extrusion of the polymeric material, as known in the art. Preferred polymers, copolymers or derivatives thereof suitable for use as the additional film are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVOH polymer, is at least 60%. The polymer can have any weight average molecular weight, preferably from about 1000 to 1,000,000, more preferably from about 10,000 to 300,000 yet more preferably from about 20,000 to 150,000. Most preferred pouch materials are PVOH films known under the trade reference MONOSOL M8630, as sold by MONOSOL LLC of Merrillville, Ind., US, and PVOH films of corresponding solubility and deformability characteristics. Other films suitable for use herein include films known under the trade reference PT film or the K-series of films supplied by Aicello, or VF-HP film supplied by Kuraray.

EXAMPLES

The following example is provided for illustration and is not intended to limit the scope of the invention.

Example 1

A 75 μm film was cast from the following formulation, all components in wt %, solids basis:

TABLE 1

| | |
|---|---|
| PVOH (MOWIOL 28-99, 99.5% degree of hydrolysis, 4% sol. visc. 28 cps at 20° C.) | 72.14 |
| glycerin | 13.30 |
| chitosan (64% acetylated, MW 150,000 to 190,000 Da) | 7.97 |
| modified starch | 4.00 |
| sorbitol | 2.23 |
| sodium bisulfite | 0.15 |
| nonionic surfactant | 0.21 |

A 75 μm film was prepared from this formulation by the following procedure: slurry the PVOH in a 2 wt % chitosan solution (cold), add all other ingredients except sodium bisulfite, heat to 95° C. with agitation to solubilize the PVOH, cool to 85° C., add sodium bisulfite after a period of seven hours and agitate to solubilize, cast solution, and dry.

The film as described above, along with MONOSOL M-8630 PVOH film, was used to form 2-compartment packets or pouches containing automatic dish washing (ADW) detergent and a rinse aid formulation. The packet was constructed as shown in FIG. 1 in cross-section, wherein the film 10 according to the example enclosed a rinse aid 14 and the conventional PVOH film 12 enclosed the ADW detergent 18. The packets were tested in an ADW machine where maximum temperatures varied between 40° C. and 65° C. The film according to the example was insoluble and had sufficient wet strength that it did not break or disintegrate during the main wash cycle (pH 10.5 to 10.7) and it was soluble in the second rinse cycle (at about pH 9.3). The film according to the example was stored at ambient conditions in a ZIPLOC polyethylene bag for 21 days, and tested in an ADW machine as described above. The film was insoluble and had sufficient wet strength that it did not break or disintegrate during the main wash cycle and it was soluble in the second rinse cycle. When using a similarly formulated film except that sodium bisulfite was omitted and the film was stored at ambient conditions in a ZIPLOC polethylene bag for 21 days, the film when tested as described above was insoluble throughout the complete wash and rinse cycle. When using a similarly formulated film except that the PVOH was a partially hydrolyzed PVOH (degree of hydrolysis 88%), the film dissolved during the main wash cycle.

Example 2

A 75 μm film was cast from the following formulation, all components in wt %, solids basis:

TABLE 2

| | |
|---|---|
| PVOH (ELVANOL 70-27, 96% degree of hydrolysis, 4% sol. visc. 27.5 cps at 20° C.) | 71.41 |
| 2-methyl-1,3-propanediol | 13.20 |
| chitosan (64% acetylated, MW 150,000 to 190,000 Da) | 7.92 |
| modified starch | 3.95 |
| sorbitol | 3.16 |
| sodium bisulfite | 0.15 |
| nonionic surfactant | 0.21 |

A 75 μm film was prepared from this formulation by the following procedure: disperse all ingredients except the PVOH and sodium bisulfite in a 2 wt % chitosan solution (cold), slurry the PVOH in the resulting solution, beat to 95° C. with agitation to solubilize the PVOH, cool to 85° C., add the sodium bisulfite after a period of ten hours, mix to solubilize, cast solution, and dry.

The film as described above, along with MONOSOL M-8630 PVOH film, was used to form 2-compartment packets or pouches containing automatic dish washing (ADW) detergent and a rinse aid formulation. The packet was constructed as shown in FIG. 1 in cross-section, wherein the film 10 according to the example enclosed a rinse aid 14 and the conventional PVOH film 12 enclosed the ADW detergent 18. The packets were tested in an ADW machine where maximum temperatures varied between 40° C. and 65° C. The film according to the example was insoluble and had sufficient wet strength that it did not break or disintegrate during the main wash cycle (pH 10.5 to 10.7) and it was soluble in the second rinse cycle (at about pH 9.3). The film according to the example was stored at ambient conditions in a ZIPLOC polyethylene bag for 21 days, and tested in an ADW machine as described above. The film was insoluble and had sufficient wet strength that it did not break or disintegrate during the main wash cycle and it was soluble in the second rinse cycle. When using a similarly formulated film except that sodium bisulfite was omitted and the film was stored at ambient conditions in a ZIPLOC polyethylene bag for 21 days, the film when tested as described above was insoluble throughout the complete wash and rinse cycle. When using a similarly formulated film except that the PVOH had a degree of hydrolysis of 88%, the film dissolved during the main wash cycle.

Example 3

As described above, the film of Examples 1 or 2 can be used to form a packet to contain cleaning compositions in one or more compartments. An example of a cleaning composition suitable is set forth in Table 3 below. In an embodiment, the film of Example 1 or 2 is used to form at least one compartment of a two compartment packet and then each compartment is filled with a cleaning active such as a nonionic surfactant or a rinse aid.

TABLE 3

| Non-liquid compartment | Powder Phase | Total Pouch |
|---|---|---|
| STPP | 47.5138 | 41.34 |
| Sodium Silicate Solids | 6.6298 | 5.77 |

TABLE 3-continued

| | | |
|---|---|---|
| Granular Sodium Carbonate | 14.6067 | 12.71 |
| Savinae/Natalse Blend | 2.2099 | 1.92 |
| protease | 0.6464 | 0.56 |
| PAAN flake/zinc carbonate | 0.0105 | 0.01 |
| Sodium Percarbonate | 11.0497 | 9.61 |
| TAED | 2.5412 | 2.21 |
| Dispersant polymer | 4.9724 | 4.33 |
| LF224 - nonionic surfactant | 1.5470 | 1.35 |
| benzotriazole | 0.1989 | 0.17 |
| Perfume | 0.2485 | 0.22 |

| Liquid compartment | Liquid Phase | Total Pouch |
|---|---|---|
| LUTENSOL ® TO7 | 32.3693 | 3.15 |
| DiPropyleneGlycol | 23.5796 | 2.29 |
| PLURAFAC ® LF224 | 32.3609 | 3.15 |
| NEODOL ® $C_{11}EO_9$ | 2.6301 | 0.26 |
| Water | 4.4601 (2.5069) | 0.43 |
| Glycerine | 4.0001 | 0.39 |
| Water | 2.5274 | 0.25 |
| dyes | 0.02-0.06 | 0.01-0.25 |

All documents cited in the Detailed Description are incorporated herein by reference. To the extent that any meaning or definition of a term in this written document conflicts with any meaning or definition of the term in a document incorporated by reference, the meaning or definition assigned to the term in this written document shall govern.

The foregoing description is given for clearness of understanding only, and no unnecessary limitations should be understood therefrom, as modifications within the scope of the invention may be apparent to those having ordinary skill in the art.

Throughout the specification, where compositions are described as including components or materials, it is contemplated that the compositions can also consist essentially of, or consist of, any combination of the recited components or materials, unless described otherwise.

The practice of a method disclosed herein, and individual steps thereof, can be performed manually and/or with the aid of electronic equipment. Although processes have been described with reference to particular embodiments, a person of ordinary skill in the art will readily appreciate that other ways of performing the acts associated with the methods may be used. For example, the order of various of the steps may be changed without departing from the scope or spirit of the method, unless described otherwise. In addition, some of the individual steps can be combined, omitted, or further subdivided into additional steps.

What is claimed is:

1. A water-soluble film comprising a mixture of PVOH, chitosan present in an amount up to 20 wt %, and an alkali metal or ammonium bisulfite or metabisulfite.

2. The film of claim 1, wherein the alkali metal or ammonium bisulfite or metabisulfite comprises sodium bisulfite.

3. The film of claim 1, wherein the alkali metal or ammonium bisulfite or metabisulfite is present in an amount in a range of 0.01 wt % to 1 wt %.

4. The film of claim 3, wherein the alkali metal or ammonium bisulfite or metabisulfite is present in an amount in a range of 0.02 wt % to 0.25 wt %.

5. The film according to claim 1, wherein the PVOH has a degree of hydrolysis of greater than 88%.

6. The film according to claim 5, wherein the PVOH has a degree of hydrolysis in a range of 92% to 98%.

7. The film according to claim 1, wherein the chitosan is present in an amount in a range of about 1 wt % to about 20 wt %.

8. The film according to claim 1, wherein the chitosan has a degree of acetylation in a range of about 55% to about 65%.

9. The film according to claim 8, wherein the chitosan has a degree of acetylation in a range of about 60% to about 65%.

10. The film according to claim 1, wherein the film is soluble in water having a pH up to about 9.3.

11. The film according to claim 1, wherein the film is insoluble in water having a pH greater than about 9.3.

12. The film according to claim 1, further comprising a plasticizer.

13. The film of claim 12, wherein the plasticizer is present in a range of about 10 wt % to about 20 wt %.

14. The film of claim 12, wherein the plasticizer comprises glycerin.

15. The water-soluble film of claim 1, comprising 50 wt % to 90 wt % PVOH having a degree of hydrolysis in a range of 92% to 98%, 1 wt % to 20 wt % chitosan having a degree of acetylation in a range of about 60% to 65%, and 0.01 wt % to 1 wt % sodium bisulfite, wherein the film is insoluble in water having a pH about 9.3 or greater.

16. A water-soluble film comprising a mixture of PVOH, chitosan and an alkali metal or ammonium bisulfite or metabisulfite wherein the weight ratio of PVOH to chitosan in a range of about 12:1 to about 3:1.

17. A sealed packet comprising the film of claim 1.

18. A method of making water-soluble film, comprising the steps of:
   preparing a solution including PVOH polymer and chitosan;
   adding an alkali metal or ammonium bisulfite or metabisulfite to the solution;
   casting the solution;
   and drying off solvent to thereby obtain a water-soluble polymer film.

19. The method of claim 18, wherein the solution of PVOH and chitosan is prepared by
   slurrying a PVOH polymer in a dilute, cold aqueous solution of chitosan;
   adding any optional ingredients to the slurry, including plasticizer antioxidants, surfactants, lubricants, and extenders; and
   heating the slurry with agitation to thereby solubilize the PVOH.

20. The method of claim 18, further comprising delaying addition of the alkali metal or ammonium bisulfite or metabisulfite to the solution including PVOH polymer and chitosan for a time sufficient to increase the wet strength of the resulting film.

21. The method of claim 20, wherein said time is at least two hours.

22. A film made by the method of claim 18.

23. The film according to claim 1, further comprising a crosslinking agent.

24. The film according to claim 23, wherein the crosslinking agent is selected from the group consisting of borax, borates, boric acid, citric acid, maleic acid, oxalic acid, malonic acid, succinic acid, cupric salts, water-soluble polyamide-epichlorohydrin, and combinations thereof.

25. The film according to claim 23, wherein the crosslinking agent is present in a range of about 0.1 wt % to about 10 wt %.

26. A water-soluble film comprising an at least substantially uniform mixture of PVOH, chitosan present in an amount up to 20 wt %, and an alkali metal or ammonium bisulfite or metabisulfite.

* * * * *